United States Patent
Tokunaga et al.

(10) Patent No.: US 12,139,227 B2
(45) Date of Patent: Nov. 12, 2024

(54) FUEL TANK AND METHOD FOR MANUFACTURING FUEL TANK

(71) Applicant: SUZUKI MOTOR CORPORATION, Hamamatsu (JP)

(72) Inventors: Katsuhiko Tokunaga, Hamamatsu (JP); Naoyuki Sezaki, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 165 days.

(21) Appl. No.: 17/561,302

(22) Filed: Dec. 23, 2021

(65) Prior Publication Data

US 2022/0212740 A1 Jul. 7, 2022

(30) Foreign Application Priority Data

Jan. 4, 2021 (JP) .................................. 2021-000165

(51) Int. Cl.
 *B60K 15/03* (2006.01)
 *B62J 35/00* (2006.01)

(52) U.S. Cl.
 CPC ............... *B62J 35/00* (2013.01); *B60K 15/03* (2013.01); *B60K 2015/03032* (2013.01); *B60K 2015/03486* (2013.01)

(58) Field of Classification Search
 CPC ........... B62J 35/00; B60K 2015/03032; B60K 2015/03486; B60K 15/03
 See application file for complete search history.

(56) References Cited

U.S. PATENT DOCUMENTS

| 2019/0039673 A1* | 2/2019 | Hirano | ...................... B62J 37/00 |
| 2019/0105982 A1* | 4/2019 | Schmitz | ........... B60K 15/03177 |
| 2020/0339206 A1* | 10/2020 | Tabuchi | ............. F02M 37/0076 |

FOREIGN PATENT DOCUMENTS

| JP | 5-16856 A | 1/1993 |
| JP | A-2005-008023 | 1/2005 |
| JP | 4761669 B2 | 6/2011 |
| JP | 2019-098886 A | 6/2019 |

OTHER PUBLICATIONS

Extended European Search Report dated Jun. 1, 2022, issued by the European Patent Office in corresponding application EP 21217295.1.

Japanese Office Action dated Jun. 11, 2024, issued to Japanese Application No. 2021-000165.

* cited by examiner

*Primary Examiner* — Stephen J Castellano
(74) *Attorney, Agent, or Firm* — Stein IP LLC (57) ABSTRACT

A fuel tank includes an outer component including an outer panel forming a tank outer shell and an inlet plate formed separately from the outer panel, an inner component including an inner panel forming a tank inner shell and an inner connection plate formed separately from the inner panel, and a pipe passing through inside of the outer panel and the inner panel and connecting the inlet plate and the inner connection plate. The inlet plate is joined to the outer panel, the inner connection plate is joined to the inner panel, and the inner panel is joined to the outer panel.

5 Claims, 9 Drawing Sheets

FUEL TANK AND METHOD FOR MANUFACTURING FUEL TANK

CROSS-REFERENCE TO RELATED APPLICATIONS

The disclosure of Japanese Patent Application No. 2021-000165 filed on Jan. 4, 2021, including specification, drawings and claims is incorporated herein by reference in its entirety.

BACKGROUND

The present invention relates to a fuel tank and a method for manufacturing the fuel tank.

A fuel tank of a straddle-type vehicle is provided with pipes such as a breather pipe and a drain pipe. A fuel tank of this type is known in which a pipe passes through the tank (for example, see Patent Literature 1). In the fuel tank disclosed in Patent Literature 1, a tank inlet is provided in an upper panel, and the pipe extends from the tank inlet to outside of the tank through a bottom wall of a lower panel. Since the pipe is hidden in the tank, an appearance of the fuel tank is maintained without covering the outside of the fuel tank with a tank cover, unlike a structure in which a pipe passes through outside of a tank.

Patent Literature 1: JP-A-2005-008023

SUMMARY

According to one advantageous aspect of the present invention, there is provided a fuel tank including: an upper component including an upper panel forming a tank upper shell and an inlet plate formed separately from the upper panel; a lower component including a lower panel forming a tank lower shell and a lower connection plate formed separately from the lower panel; and a pipe passing through inside of the upper panel and the lower panel and connecting the inlet plate and the lower connection plate. The inlet plate is joined to the upper panel, the lower connection plate is joined to the lower panel, and the lower panel is joined to the upper panel.

DETAILED DESCRIPTION OF EXEMPLIFIED EMBODIMENT

In recent years, fuel tanks are manufactured using various materials. At the time of manufacturing the fuel tank disclosed in Patent Literature 1, brazing or the like is used for joining panels and pipes, but it may be difficult to manufacture the fuel tank due to manufacturing restrictions depending on the material and size.

The present invention has been made in view of the above, and an object thereof is to provide a fuel tank capable of maintaining an appearance of the fuel tank by allowing a pipe to pass through the tank even when there are manufacturing restrictions due to the material and size, and a method for manufacturing the fuel tank.

A fuel tank according to an aspect of the present invention includes an upper component in which an inlet plate is joined to an upper panel forming a tank upper shell, and a lower component in which a lower connection plate is joined to a lower panel forming a tank lower shell. The upper panel and the inlet plate are formed separately, and the lower panel and the lower connection plate are formed separately. Therefore, even when work is suitable for a material but has size restrictions, the work can be performed on the inlet plate and the lower connection plate. In this way, it is possible to flexibly select work that satisfies manufacturing restrictions due to the material and size. In addition, the upper component and the lower component are integrated, so that the fuel tank in which the pipe passes through the tank is manufactured. In order to maintain an appearance, a large tank cover that covers the entire tank is not required, and without a double structure, capacity of the fuel tank is not reduced.

Figure 1:
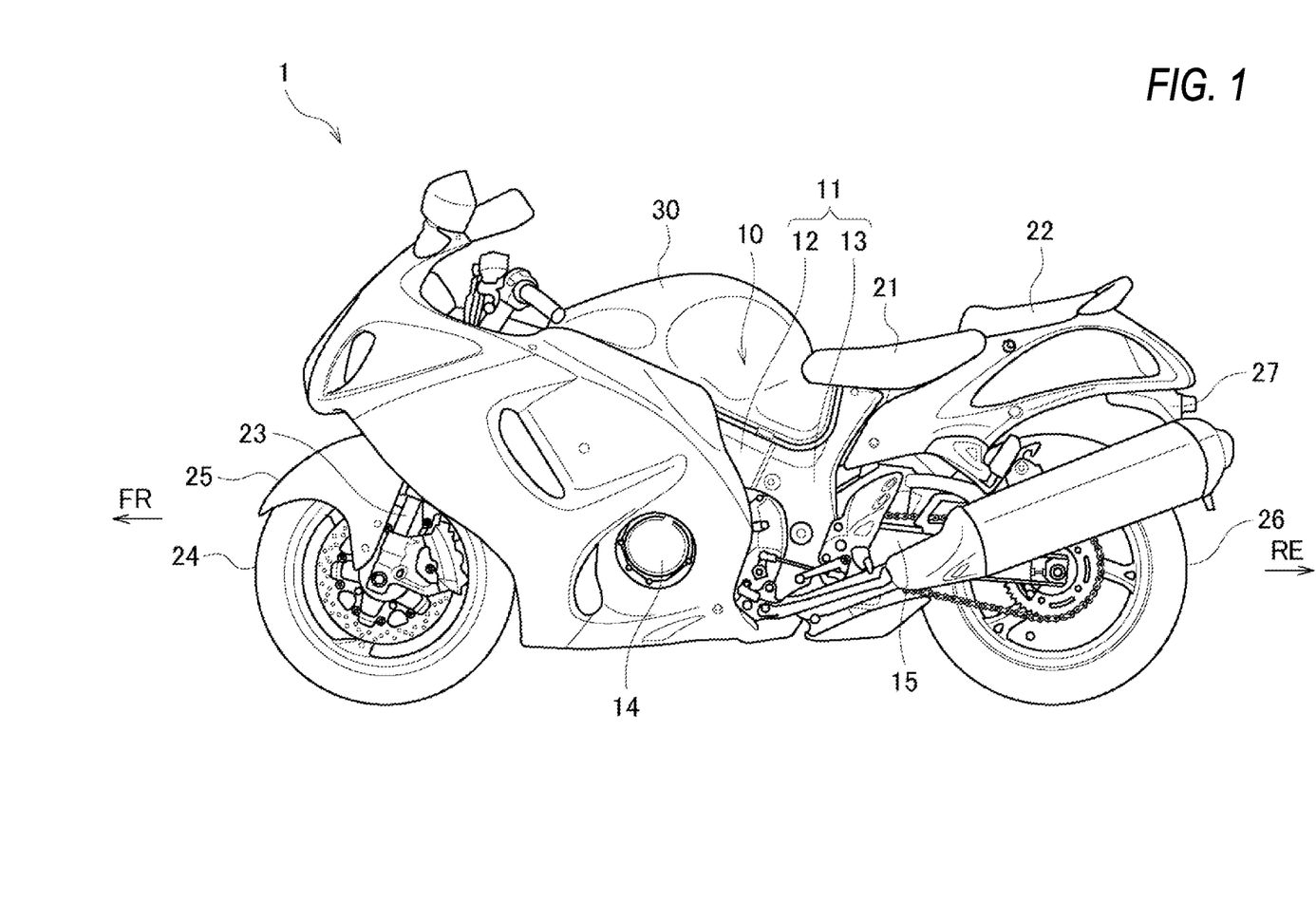
FIG. 1 is a left side view of a straddle-type vehicle according to an embodiment of the present invention.

Hereinafter, an embodiment will be described in detail with reference to the accompanying drawings. FIG. 1 is a left side view of a straddle-type vehicle according to the present embodiment. In the following drawings, an arrow FR indicates a vehicle front side, an arrow RE indicates a vehicle rear side, an arrow L indicates a vehicle left side, and an arrow R indicates a vehicle right side.

As shown in FIG. 1, a straddle-type vehicle 1 is configured by mounting various components such as an engine 14 and an electrical system on a twin-spar type vehicle body frame 10 formed by aluminum casting. The vehicle body frame 10 includes a pair of main frames 11 branching from a head pipe (not shown) to left and right sides and extending rearward, and a pair of down frames (not shown) branching from the head pipe to the left and right sides and extending downward. A rear portion of the engine 14 is supported by the pair of main frames 11, and a front portion of the engine 14 is supported by the pair of down frames. Since the engine 14 is supported by the vehicle body frame 10, a rigidity of the entire vehicle is ensured.

A front side portion of the main frame 11 is a tank rail 12 located above the engine 14, and a fuel tank 30 is supported by the tank rail 12. A rear side portion of the main frame 11 is a body frame 13 located behind the engine 14, and a swing arm 15 is swingably supported at a substantially intermediate position of the body frame 13 in an upper-lower direction. A seat rail (not shown) and a backstay (not shown) extend rearward from an upper portion of the body frame 13. A rider seat 21 and a pillion seat 22 are supported on the seat rail behind the fuel tank 30.

A pair of front forks 23 are steerably supported by the head pipe via a steering shaft (not shown). A front wheel 24 is rotatably supported by lower portions of the front forks 23, and an upper portion of the front wheel 24 is covered with a front fender 25. The swing arm 15 extends rearward from the body frame 13. A rear wheel 26 is rotatably supported at a rear end of the swing arm 15, and the rear wheel 26 is covered with a rear fender 27 from above. The engine 14 is coupled to the rear wheel 26 via a chain drive type transmission mechanism, and power from the engine 14 is transmitted to the rear wheel 26 via the transmission mechanism.

Such a straddle-type vehicle is often equipped with a fuel tank made of a steel plate for reasons such as productivity and cost, but may be equipped with a fuel tank made of a non-ferrous metal or a resin, which is advantageous in terms of specific gravity. Most of non-ferrous metal fuel tanks are made of aluminum, and many of resin fuel tanks are made of polyethylene (PE) or nylon (PA). All of them have manufacturing methods different from those of steel plate fuel tanks, and require special manufacturing equipment and molds. Recently, manufacture of a fuel tank made of titanium, which has properties close to those of iron as compared with aluminum, as a nonferrous metal, has been studied.

One of the properties of titanium is a property of easily deteriorating due to reacting with oxygen, and thus manual brazing (torch brazing) in atmosphere, which has been performed at the time of manufacturing a fuel tank made of a steel sheet, cannot be performed. Brazing is employed in a fuel tank that requires airtightness, as a welding method for a portion where a working range is narrow, such as joining of pipes, in order to fill a gap between members by a capillary action without melting a base material. When in-furnace brazing is performed, the brazing can be performed in an oxygen-free environment, but a large component such as a panel component of a fuel tank cannot be put into a furnace, and pipes cannot be directly welded to the panel component.

In a case of a fuel tank made of a steel plate, since brazing work can be performed in the atmosphere, pipes can be manually brazed to a tank inlet of an upper panel, and the pipes can be manually brazed directly to a lower panel while passing through the tank. In a case of a fuel tank made of titanium, it is necessary to perform all welding in an oxygen-free environment, but since pipes cannot be brazed to a large lower panel in a furnace as described above, it is difficult for the pipes to pass through the tank. For this reason, in a general fuel tank made of titanium, a rubber hose is extended from a tank inlet to outside of the tank.

In order to maintain an appearance of the fuel tank, it is necessary to cover the fuel tank with a tank cover so as to hide the rubber hose outside the tank. When the tank cover is attached to the fuel tank, an advantage of reducing a weight due to titanium is reduced, and the fuel tank has a double structure, resulting in reduction of capacity. Therefore, in the fuel tank 30 according to the present embodiment, connection plates for pipes are separated from a lower panel 61 in a size that allows in-furnace brazing (see FIG. 4). Thereby, even in a case of the fuel tank 30 made of titanium, which is subject to manufacturing restrictions due to the material and size, it is possible to maintain an appearance of the fuel tank 30 by allowing the pipes to pass through the tank.

Figure 2:
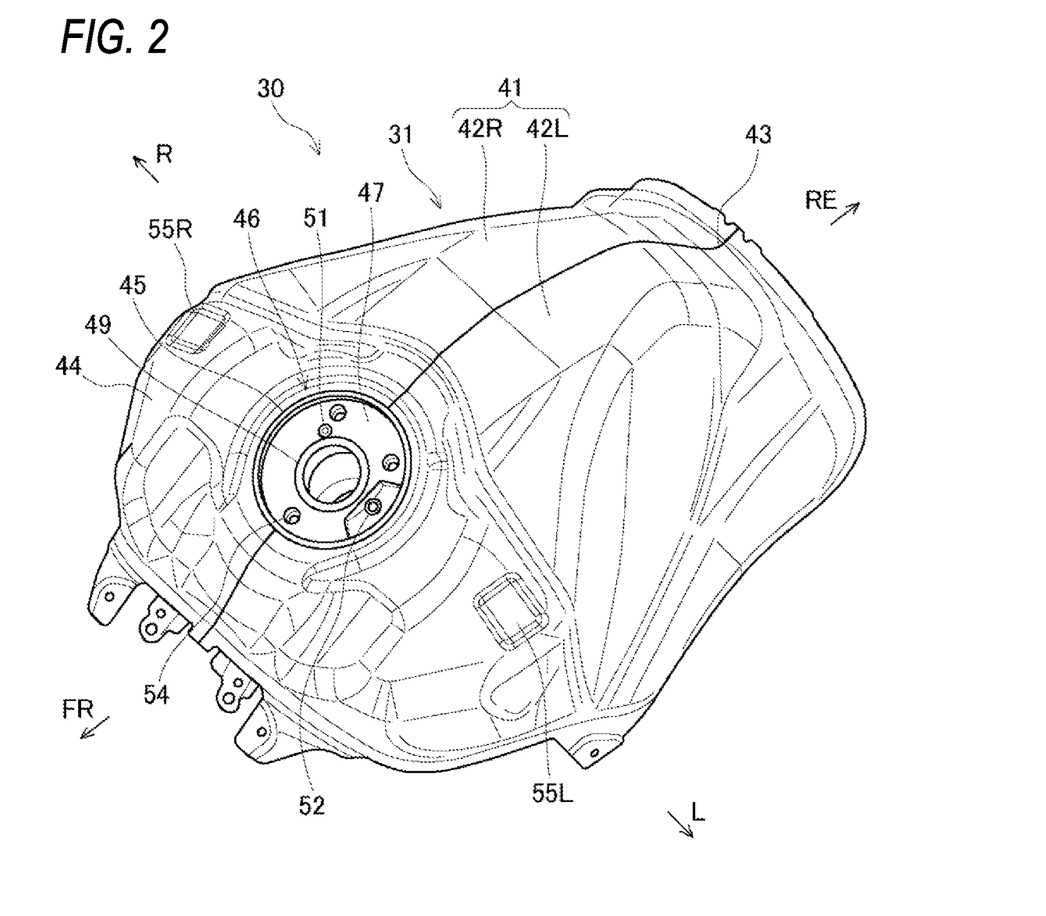
FIG. 2 is a perspective view of a fuel tank according to the present embodiment as viewed from above.
Figure 3:
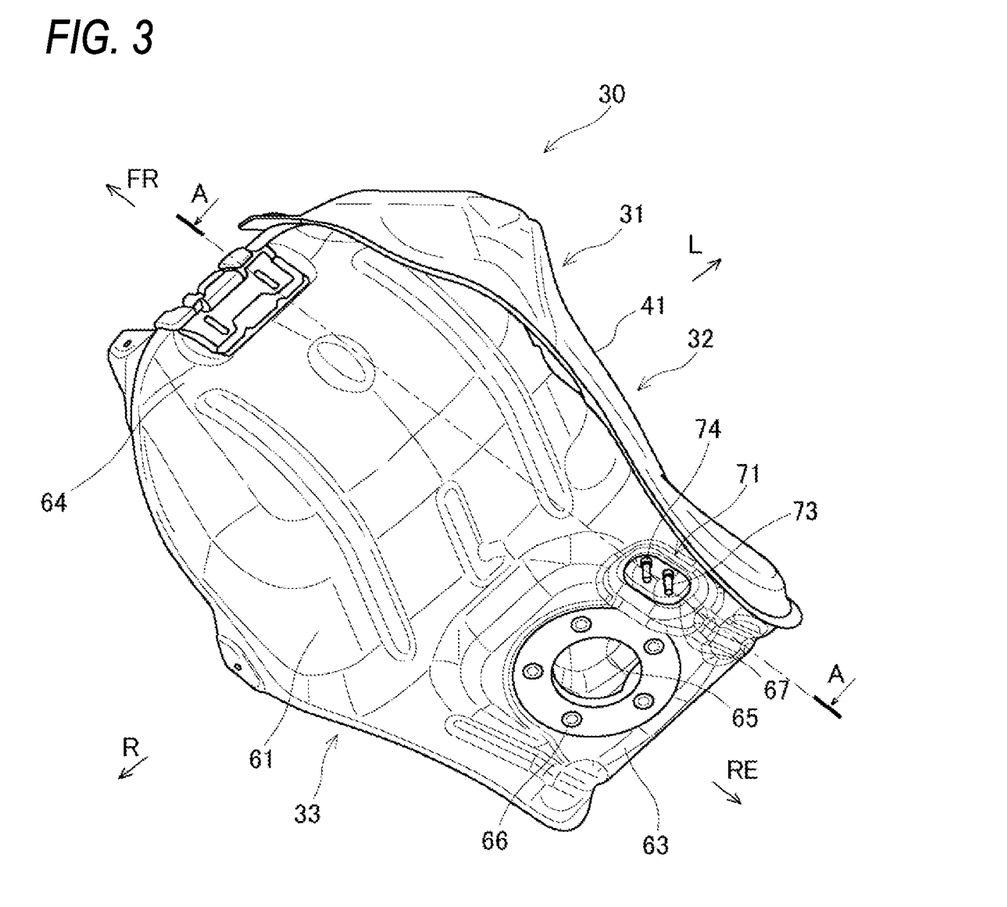
FIG. 3 is a perspective view of the fuel tank according to the present embodiment as viewed from below.
Figure 4:
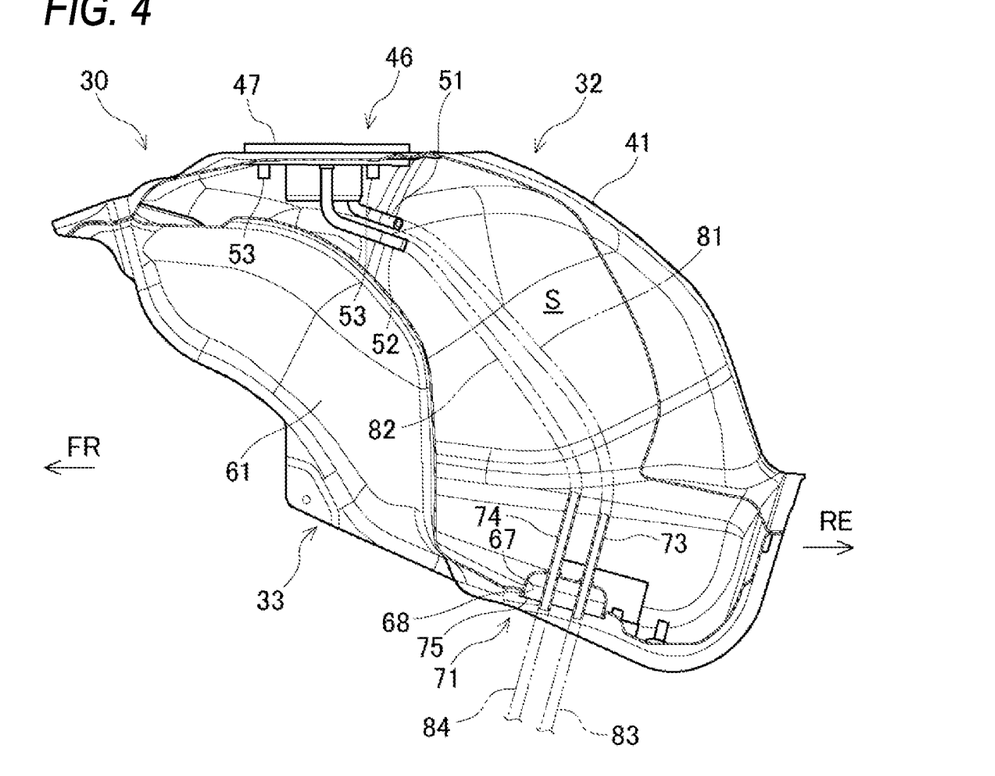
FIG. 4 is a cross-sectional view of the fuel tank taken along a line A-A in FIG. 3.
Figure 5:
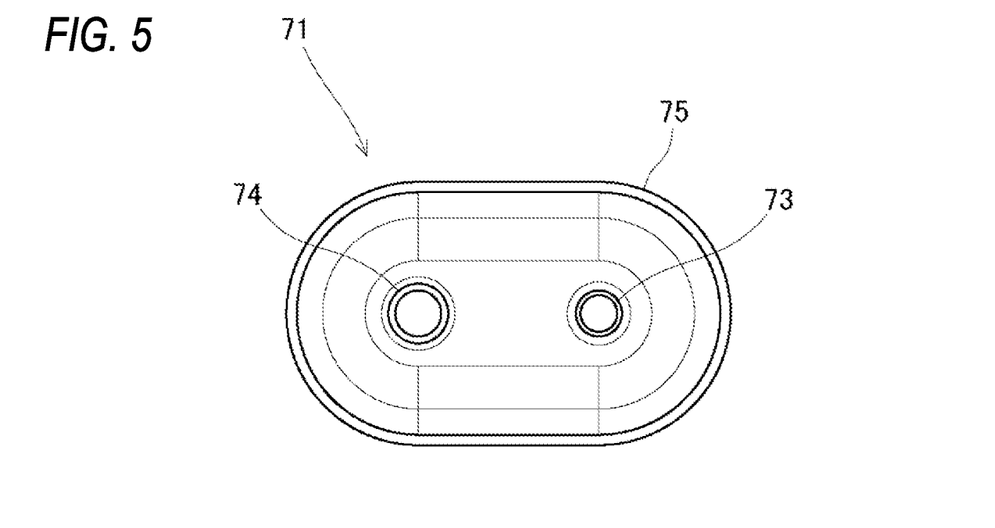
FIG. 5 is a front view of a lower connection plate according to the present embodiment.

Hereinafter, the fuel tank will be described with reference to FIGS. 2 to 5. FIG. 2 is a perspective view of the fuel tank according to the present embodiment as viewed from above. FIG. 3 is a perspective view of the fuel tank according to the present embodiment as viewed from below. FIG. 4 is a cross-sectional view of the fuel tank taken along a line A-A in FIG. 3. FIG. 5 is a front view of the lower connection plate according to the present embodiment.

As shown in FIG. 2, a tank body 31 of the fuel tank 30 is formed by joining upper edges of a upper panel 41 forming a tank upper shell and the lower panel 61 forming a tank lower shell (see FIG. 3). The upper panel 41 and the lower panel 61 form a fuel storage space S (see FIG. 4). The upper panel 41 is formed in a substantially dome shape such that symmetrical panel members 42L, 42R are joined along a center line in a front-rear direction and rise from a panel rear portion 43 toward a panel front portion 44. A surface of the panel front portion 44 of the upper panel 41 is lowered by one step as a whole, and a tank cover 59 (see FIG. 10C) is formed to be attachable to the panel front portion 44.

A circular opening 45 is formed in a center of the panel front portion 44 of the upper panel 41, and a tank inlet 46 is joined to the circular opening 45. The tank inlet 46 includes a bottomed cylindrical inlet plate 47 and an inlet pipe 49 attached to a bottom wall of the inlet plate 47. A tank cap (not shown) is attached to the inlet plate 47, and a fuel filling port of the inlet pipe 49 is opened and closed by the tank cap. When a fuel filling nozzle (not shown) is inserted into the inlet pipe 49 with the tank cap open, fuel is supplied from the fueling nozzle to the storage space S of the tank body 31.

An upper breather pipe 51 and an upper drain pipe 52 as upper pipes are joined to the bottom wall of the inlet plate 47. The upper breather pipe 51 and the upper drain pipe 52 extend from the bottom wall of the inlet plate 47 into the tank (particularly, see FIG. 4). An upstream side of a breather pipe is formed by the upper breather pipe 51, and an upstream side of a drain pipe is formed by the upper drain pipe 52. The inlet plate 47 is slightly recessed around a joint portion of the upper drain pipe 52, and liquid droplets on the inlet plate 47 are easily collected at an inlet of the upper drain pipe 52.

Screw holes 54 for three nuts 53 (see FIG. 4) are exposed from the bottom wall of the inlet plate 47. The tank cap is attached to the tank inlet 46 by screwing the tank cap into these screw holes 54. Seat surfaces 55L, 55R for a cover bracket (not shown) are formed on both left and right sides of the panel front portion 44 of the upper panel 41. When the cover bracket is joined to the seat surfaces 55L, 55R, the tank cover 59 (see FIG. 10C) is attached to the panel front portion 44 of the upper panel 41 via the cover bracket. A periphery of the tank cap is covered with the tank cover 59 so as to hide the tank inlet 46.

As shown in FIG. 3, the lower panel 61 includes a panel rear portion 63 formed in a planar shape, and is formed in a substantially dome shape so as to rise from a front side of the panel rear portion 63 toward a panel front portion 64. A circular opening 65 is formed in a center of a bottom surface of the panel rear portion 63 of the lower panel 61, and an upper side of a fuel pump (not shown) is inserted into the tank through the circular opening 65. A plurality of screw holes 66 are formed around the circular opening 65, and a flange portion on a lower side of the fuel pump is screwed into the screw holes 66. The fuel in the tank is pumped out by the fuel pump and sent to a fuel injector (not shown) of the engine 14 (see FIG. 1).

An oval opening 67 is formed next to the circular opening 65 (on a left side in the present embodiment), and a lower connection plate 71 is joined to the opening 67. The lower connection plate 71 is formed in a dome shape bulging into the tank, and a lower breather pipe 73 and a lower drain pipe 74 as lower pipes are joined to an upper bottom wall of the lower connection plate 71. The lower breather pipe 73 and the lower drain pipe 74 pass through the upper bottom wall of the lower connection plate 71 (particularly, see FIG. 4). A downstream side of the breather pipe is formed by the lower breather pipe 73, and a downstream side of the drain pipe is formed by the lower drain pipe 74.

As shown in FIG. 4, the upper breather pipe 51 and the upper drain pipe 52 are substantially L-shaped, and the lower breather pipe 73 and the lower drain pipe 74 are straight. A downstream end of the upper breather pipe 51 and an upstream end of the lower breather pipe 73 are connected to each other via a first breather hose (pipe) 81, and a downstream end of the upper drain pipe 52 and an upstream end of the lower drain pipe 74 are connected to each other via a first drain hose (pipe) 82. The inlet plate 47 and the lower connection plate 71 are connected to each other by the first breather hose 81 and the first drain hose 82 passing inside the upper panel 41 and the lower panel 61.

A second breather hose 83 is connected to a downstream end of the lower breather pipe 73 outside the tank, and a second drain hose 84 is connected to a downstream end of the lower drain pipe 74 outside the tank. In this way, the upper breather pipe 51, the first breather hose 81, the lower breather pipe 73 and the second breather hose 83 form a breather pipe that guides a gas component in the tank inlet 46 to outside of the fuel tank 30. The upper drain pipe 52, the first drain hose 82, the lower drain pipe 74 and the second drain hose 84 form a drain pipe that discharges liquid droplets in the tank inlet 46.

The oval opening 67 of the inner panel 61 is formed along an outer peripheral edge 75 of the inner connection plate 71, and an opening edge 68 of the inner panel 61 is located closer to the outer surface side of the tank. The outer peripheral edge 75 of the inner connection plate 71 is located on an outer surface side of the fuel tank relative to the opening along the outer peripheral edge of the lower connection plate, and a lower end surface of the outer peripheral edge 75 of the inner connection plate 71 is aligned with a lower end surface of the opening edge 68 of the inner panel 61. Since the opening edge 68 of the inner panel 61 and the outer peripheral edge 75 of the inner connection plate 71 protrude to the outside of the tank, the outer peripheral edge 75 of the inner connection plate 71 is easily and reliably joined to the opening edge 68 of the inner panel 61 from the outside of the tank.

At this time, the lower breather pipe 73 and the lower drain pipe 74 pass through the upper bottom wall of the lower connection plate 71 substantially perpendicularly. When the lower connection plate 71 is viewed from a front side, that is, when the lower connection plate 71 is directly faced, the downstream end of the lower breather pipe 73 and the downstream end of the lower drain pipe 74 are located inward than the upper peripheral edge 75 of the lower connection plate 71 (see FIG. 5). Therefore, when the lower connection plate 71 and the lower panel 61 are joined by welding, the lower breather pipe 73 and the lower drain pipe 74 protruding to the outside of the tank do not interfere with a welding torch.

When the fuel tank 30 is manufactured, an upper component 32 including the upper panel 41 and upper related components, and a lower component 33 including the lower panel 61 and lower related components are individually manufactured. After the first breather hose 81 and the first drain hose 82 are connected, the upper component 32 and the lower component 33 are integrated to manufacture the fuel tank 30. The upper component 32 and the lower component 33 are each made of titanium or titanium alloy, and members are welded to each other in an oxygen-free environment, so that a weight of the fuel tank 30 is reduced and weather resistance and rust resistance are improved.

As described above, since it is necessary to perform in-furnace brazing in the oxygen-free environment for joining the pipes and the plates, the inlet plate 47 and the lower connection plate 71 are formed in a size that can be accommodated in a furnace. Since the upper panel 41 and the inlet plate 47 are formed separately in this manner, the inlet plate 47, the upper breather pipe 51 and the upper drain pipe 52 are brazed in the furnace. Similarly, since the lower panel 61 and the lower connection plate 71 are formed separately, the lower connection plate 71, the lower breather pipe 73 and the lower drain pipe 74 are brazed in the furnace.

A method for manufacturing the fuel tank will be described with reference to FIGS. 6A to 10C. FIGS. 6A to 7D are transition views showing a method for manufacturing a fuel tank made of a steel plate according to a comparative example. FIGS. 8A to 10C are transition views showing a method for manufacturing the fuel tank made of titanium according to the present embodiment. The fuel tank made of the steel plate according to the comparative example is different from the fuel tank according to the present embodiment in that each of a breather pipe and a drain pipe is formed of one pipe, and a lower connection plate is not formed.

Figure 6A:
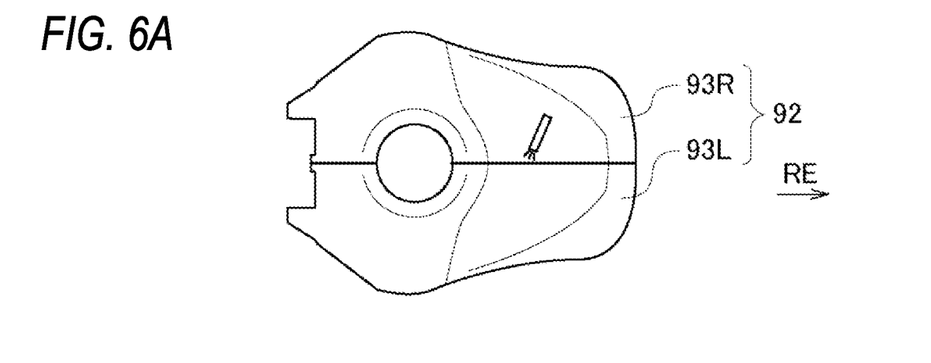
FIGS. 6A to 6C are transition views showing a method for manufacturing a fuel tank made of a steel plate according to a comparative example.
Figure 6B:
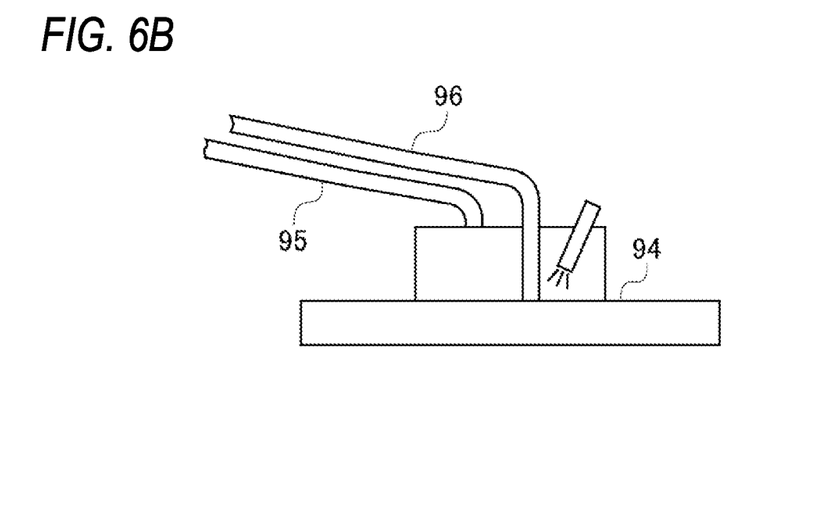
Figure 6C:
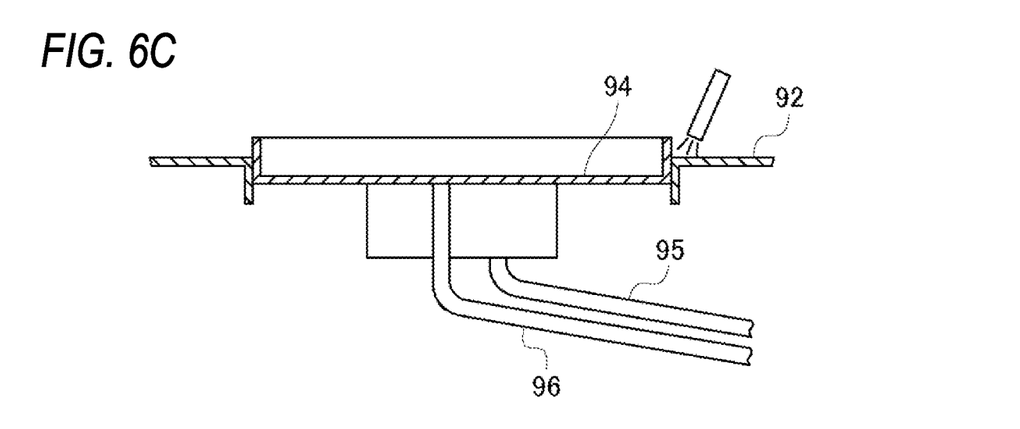

In the method for manufacturing the fuel tank made of the steel plate shown in the comparative example, individual components of the fuel tank are manufactured. For example, various panels are press-formed by manufacturing equipment such as a press machine. Next, as shown in FIGS. 6A to 6C, work of manufacturing an upper component 91 is performed. First, the work of manufacturing the upper panel 92 shown in FIG. 6A is performed. In this case, a shield gas is blown onto mating surfaces of panel members 93L, 93R, and the mating surfaces of the panel members 93L, 93R are plasma-welded in an oxygen-free environment. An inlet related component such as a cover bracket is spot-welded to the upper panel 92.

Next, work of joining a breather pipe 95 and a drain pipe 96 to an inlet plate 94 shown in FIG. 6B is performed. In this case, in a state where the breather pipe 95 and the drain pipe 96 are inserted into the inlet plate 94, the breather pipe 95 and the drain pipe 96 are manually brazed to the inlet plate 94 in atmosphere. Next, work of joining the inlet plate 94 to the upper panel 92 shown in FIG. 6C is performed. In this case, an upper peripheral edge of the inlet plate 94 is welded to an opening edge of the upper panel 92 by metal active gas (MAG) welding while blowing the shield gas.

Figure 7A:
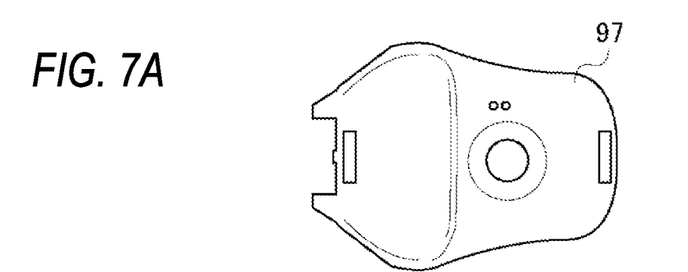
FIGS. 7A to 7D are transition views showing the method for manufacturing the fuel tank made of the steel plate according to the comparative example.
Figure 7B:
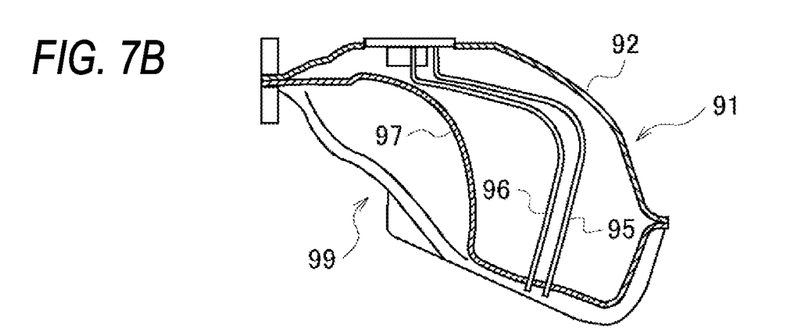

As shown in FIG. 7A, work of manufacturing a lower component 99 is performed. In this case, an attachment component to a fuel pump and a lower-related component such as a bracket for a vehicle body frame are spot-welded to a lower panel 97. As shown in FIG. 7B, work of integrating the upper component 91 and the lower component 99 is performed. In this case, an upper peripheral edge of the upper panel 92 and an upper peripheral edge of the lower panel 97 are aligned with each other, and the breather pipe 95 and the drain pipe 96 are inserted into through holes of the lower panel 97. Then, the upper peripheral edge of the upper panel 92 and the upper peripheral edge of the lower panel 97 are seam-welded to integrate the upper component 91 and the lower component 99.

Figure 7C:
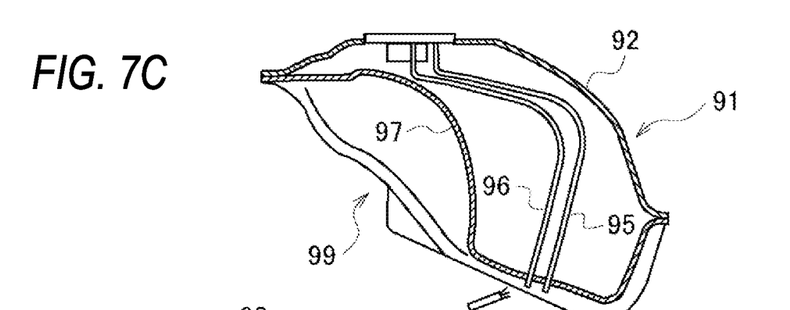
Figure 7D:
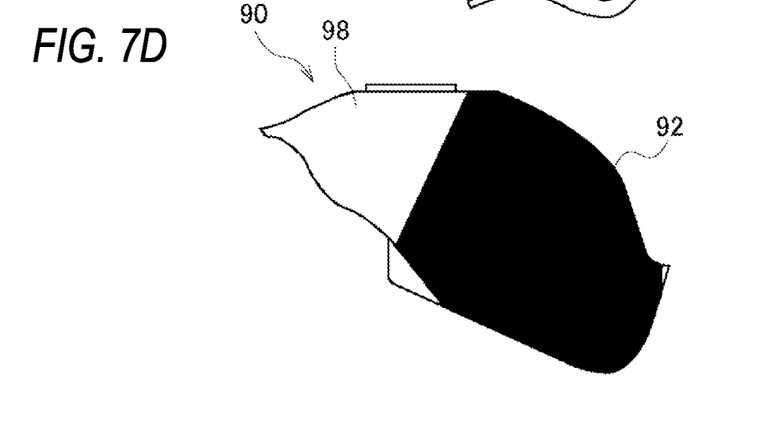

As shown in FIG. 7C, work of joining the breather pipe 95 and the drain pipe 96 to the lower panel 97 is performed. In this case, the breather pipe 95 and the drain pipe 96 are manually brazed to the lower panel 97 in the atmosphere. As shown in FIG. 7D, surface treatment work on the upper panel 92 is performed. In a fuel tank 90 made of the steel plate, coating treatment is selected as surface treatment on the upper panel 92. By coating a surface of the upper panel 92, an appearance, weather resistance and rust resistance of the upper panel 92 are improved. Then, a tank cover 98 is attached to the upper panel 92 to manufacture the fuel tank 90.

In the fuel tank made of titanium shown in the present embodiment, since properties of titanium are close to those of iron as compared with aluminum, some manufacturing equipment and the like are used in common with the fuel tank made of the steel plate. First, individual components of the fuel tank are manufactured. For example, the upper panel 41 and the lower panel 61 are press-formed. At this time, in press forming of the upper panel 41 and the lower panel 61, which are the most expensive, the manufacturing equipment such as a die or a press machine for the fuel tank 90 made of the steel plate can be used. The manufacturing equipment of the fuel tank 90 made of the steel plate can also be used for manufacturing some peripheral components of the upper panel 41 and the lower panel 61.

Figure 8A:
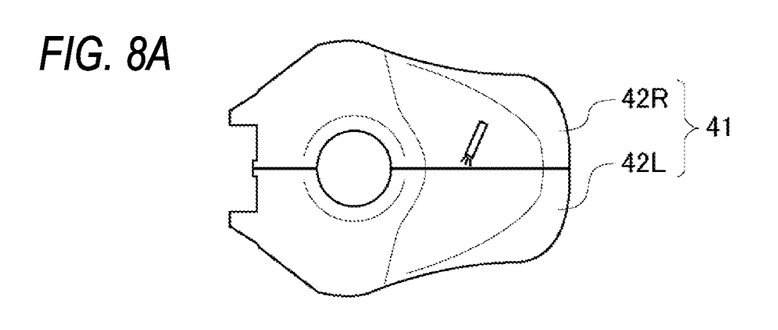
FIGS. 8A to 8C are transition views showing a method for manufacturing the fuel tank made of titanium according to the present embodiment.
Figure 8B:
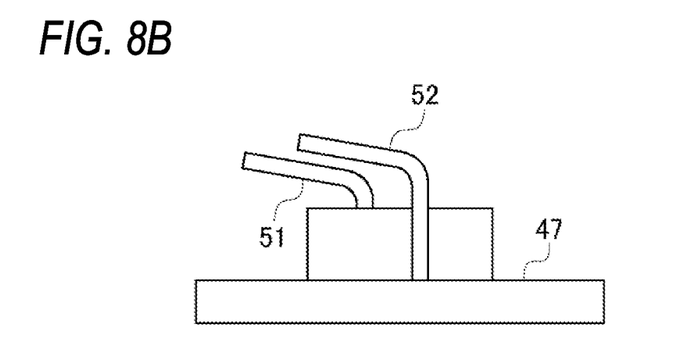
Figure 8C:
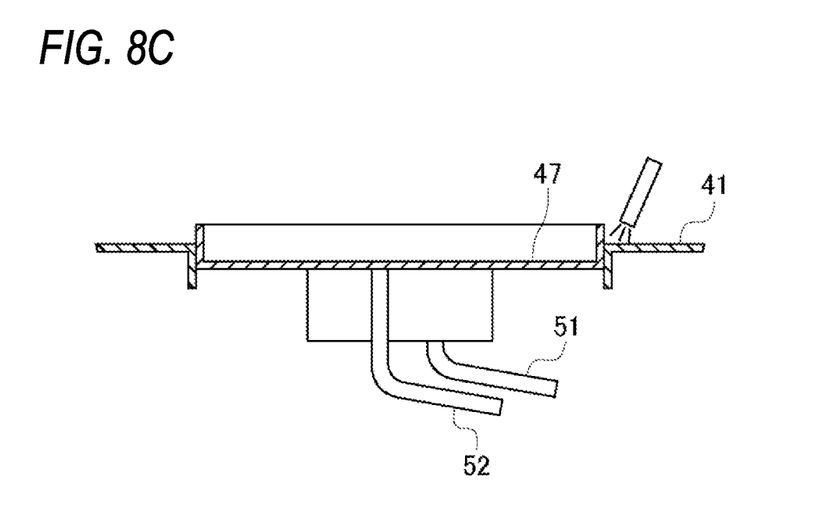

As shown in FIGS. 8A to 8C, work of manufacturing the upper component 32 (a step of manufacturing the upper component) is performed. First, work of forming the upper panel 41 shown in FIG. 8A is performed. In this case, a shield gas is blown onto mating surfaces of the panel members 42L, 42R, and the mating surfaces of the panel members 42L, 42R are plasma-welded in the oxygen-free environment. An inlet related component such as a cover bracket is spot-welded to the upper panel 41. In the welding, the manufacturing equipment of the fuel tank 9X) made of the steel plate can be used. In spot welding, since joint surfaces of the members are blocked from the atmosphere, an influence of oxygen on the upper panel 41 made of titanium is minimized.

Next, work of joining the upper breather pipe 51 and the upper drain pipe 52 to the inlet plate 47 shown in FIG. 8B (a sub-step of in-furnace brazing) is performed. In this case, the upper breather pipe 51 and the upper drain pipe 52 are accommodated in the furnace in the state where the upper breather pipe 51 and the upper drain pipe 52 are inserted into the inlet plate 47, and the upper breather pipe 51 and the upper drain pipe 52 are brazed to the inlet plate 47 in the furnace in the oxygen-free environment. Since the inlet plate 47 is formed to have a size that can be accommodated in the furnace, in-furnace brazing having size restrictions can be performed.

Next, work of joining the inlet plate 47 to the upper panel 41 shown in FIG. 8C (a sub-step of TIG welding) is performed. In this case, an upper peripheral edge of the inlet plate 47 is welded to an opening edge of the upper panel 41 by tungsten inert gas (TIG) welding while blowing the shield gas. By partially modifying welding equipment of the fuel tank 90 made of the steel sheet, not only the MAG welding but also the TIG welding can be performed. For this reason, the manufacturing equipment of the fuel tank 90 made of the steel plate can also be used for welding the upper panel 41 and the inlet plate 47.

Figure 9A:
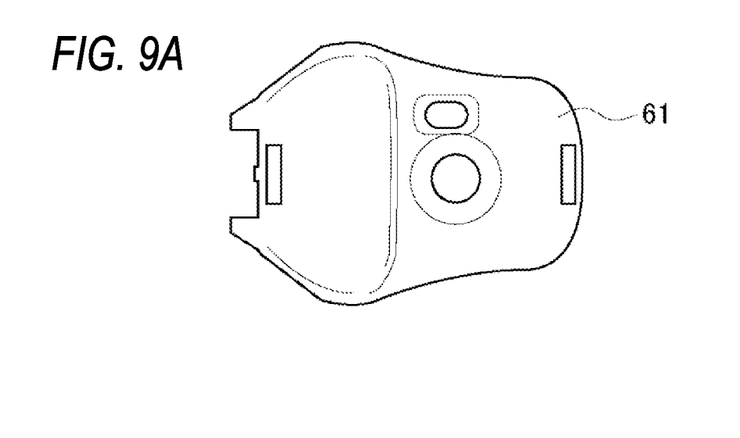
FIGS. 9A to 9C are transition views showing the method for manufacturing the fuel tank made of titanium according to the present embodiment.
Figure 9B:
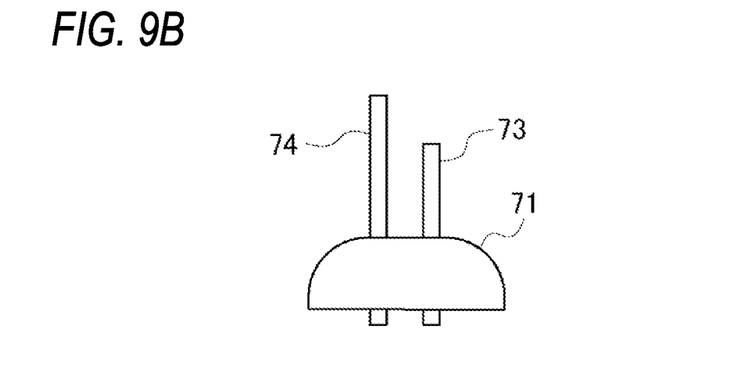
Figure 9C:
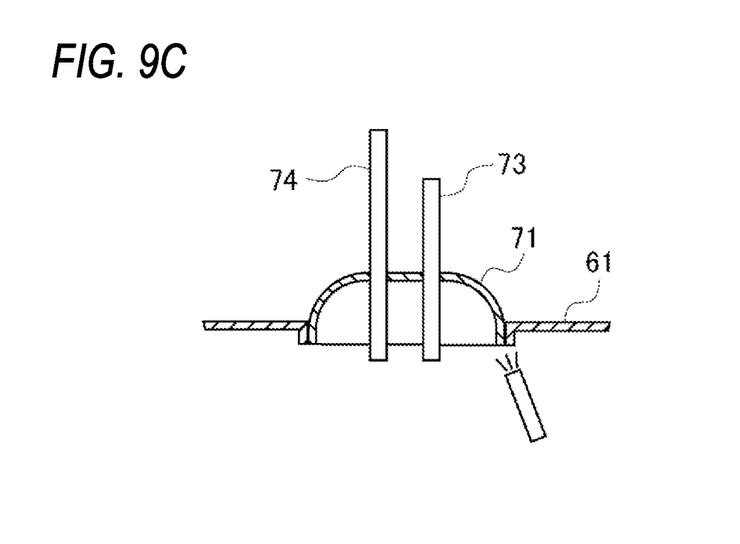

As shown in FIGS. 9A to 9C, work of manufacturing the lower component 33 (a step of manufacturing the lower component 33) is performed. First, work of forming the lower panel 61 shown in FIG. 9A is performed. In this case, an attachment component to a fuel pump and a lower related component such as a bracket for a vehicle body frame are spot-welded to the lower panel 61. In the welding, the manufacturing equipment of the fuel tank 90 made of the steel plate can be used.

Next, work of joining the lower breather pipe 73 and the lower drain pipe 74 to the lower connection plate 71 shown in FIG. 9B (a sub-step of in-furnace brazing) is performed. In this case, the lower breather pipe 73 and the lower drain pipe 74 are accommodated in the furnace in a state where the lower breather pipe 73 and the lower drain pipe 74 are inserted into the lower connection plate 71, and the lower breather pipe 73 and the lower drain pipe 74 are brazed to the lower connection plate 71 in the furnace in the oxygen-free environment. Since the lower connection plate 71 is formed to have a size that can be accommodated in the furnace, in-furnace brazing having size restrictions can be performed.

Next, work of joining the lower connection plate 71 to the lower panel 61 shown in FIG. 9C (a sub-step of TIG welding) is performed. In this case, the upper peripheral edge of the lower connection plate 71 is welded to the opening edge of the lower panel 61 by tungsten inert gas (TIG) welding while blowing the shield gas. As described above, by partially modifying the welding equipment of the fuel tank 90 made of the steel sheet, not only the MAG welding but also the TIG welding can be performed. For this reason, the manufacturing equipment of the fuel tank 90 made of the steel plate can also be used for welding the lower panel 61 and the lower connection plate 71.

Figure 10A:
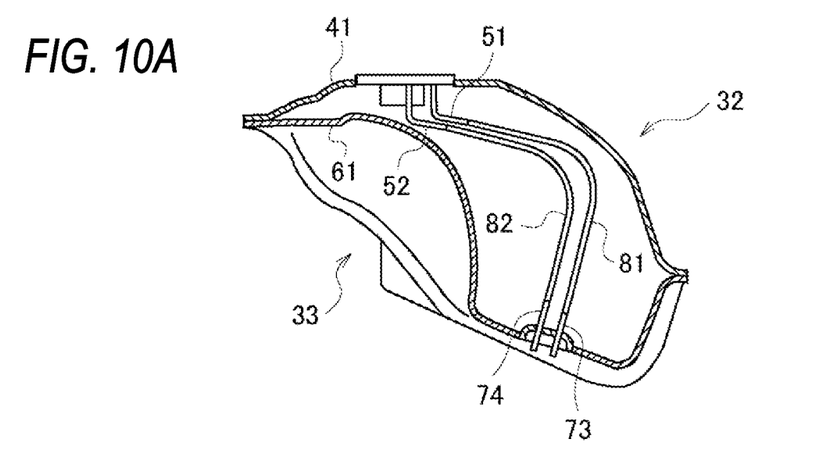
FIGS. 10A to 10C are transition views showing the method for manufacturing the fuel tank made of titanium according to the present embodiment.
Figure 10B:
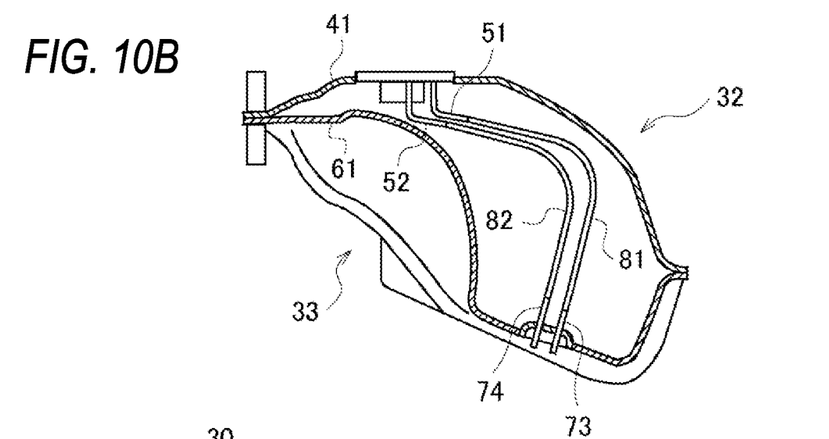

As shown in FIGS. 10A and 10B, work of integrating the upper component 32 and the lower component 33 (a step of integrating) is performed. First, work of connecting the first breather hose 81 and the first drain hose 82 to the pipes shown in FIG. 10A (a sub-step of connecting) is performed. In this case, the upper breather pipe 51 of the upper component 32 and the lower breather pipe 73 of the lower component 33 are connected to each other via the first breather hose 81. The upper drain pipe 52 of the upper component 32 and the lower drain pipe 74 of the lower component 33 are connected to each other via the first drain hose 82. A rubber hose or a resin hose having flexibility and oil resistance is used for the first breather hose 81 and the first drain hose 82.

Next, work of joining the upper panel 41 and the lower panel 61 shown in FIG. 10B (a sub-step of seam welding) is performed. In this case, an upper peripheral edge of the upper panel 41 and an upper peripheral edge of the lower panel 61 are aligned with each other, and the upper peripheral edge of the upper panel 41 and the upper peripheral edge of the lower panel 61 are seam-welded. Also for seam welding, the manufacturing equipment of the fuel tank 90 made of the steel plate can be used. In the seam welding, since joint surfaces of the upper panel 41 and the lower panel 61 are blocked from the atmosphere, an influence of oxygen on the upper panel 41 and the lower panel 61 made of titanium is minimized.

Figure 10C:
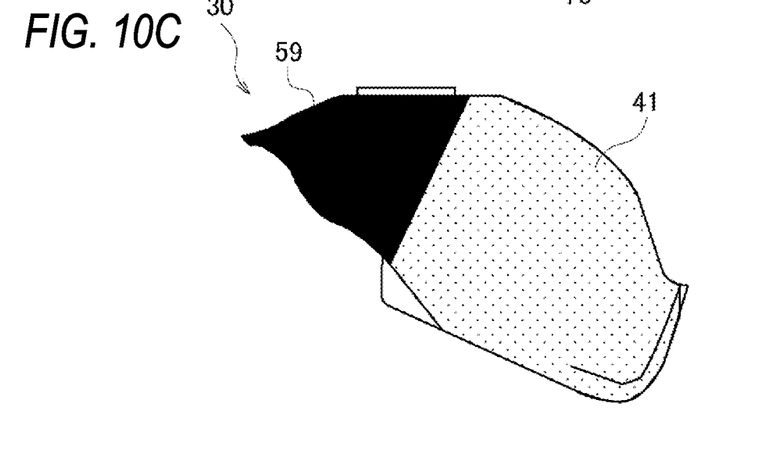

As shown in FIG. 10C, surface treatment work (a step of roughening) is performed on the upper panel 41. In the fuel tank 30 made of titanium, shot treatment is selected as surface treatment on the upper panel 41. Since titanium has excellent weather resistance and rust resistance, physical properties do not deteriorate even when coating treatment is not performed, but a surface of the upper panel 41 has processing marks such as press scratches and beads. The shot treatment removes the processing marks, and the exposed metal surface improves the appearance. Then, the tank cover 59 is attached to the upper panel 41 to manufacture the fuel tank 30. As the tank cover 59, a cover the same as that of the fuel tank 90 made of the steel plate can be used.

As described above, according to the present embodiment, the upper panel 41 and the inlet plate 47 are formed separately, and the lower panel 61 and the lower connection plate 71 are formed separately. Therefore, even in a case of in-furnace brazing suitable for titanium but having size restrictions, in-furnace brazing can be used for joining pipes to the inlet plate 47 and the lower connection plate 71. In this way, it is possible to flexibly select work that satisfies manufacturing restrictions due to the material and size. By integrating the upper component 32 and the lower component 33, the fuel tank 30 in which the pipes passes through the tank is manufactured. In order to maintain the appearance, a large tank cover that covers the entire tank is not required, and without a double structure, capacity of the fuel tank 30 is not reduced.

The fuel tank according to the present embodiment can also be appropriately applied to other straddle-type vehicles such as a buggy-type motor tricycle. Here, the straddle-type vehicle is not limited to general vehicles in which a rider rides in a posture of straddling a seat, but also includes a scooter-type vehicle in which a rider rides without straddling a seat.

In the present embodiment, the method for manufacturing the fuel tank made of titanium has been described, but this manufacturing method can also be applied to manufacture of fuel tanks made of other materials. In particular, the present invention is effective for manufacturing a fuel tank using a material that requires joining in an oxygen-free environment or a low-oxygen environment.

In the present embodiment, the breather pipe is formed by four components including the upper breather pipe, the first breather hose, the lower breather pipe and the second breather hose, but the breather pipe may be formed by one component. Similarly, in the present embodiment, the drain pipe is formed by four components including the upper drain pipe, the first drain hose, the lower drain pipe and the second drain hose, but the drain pipe may be formed by one component.

In the present embodiment, the upper component and the lower component are made of titanium, but some components of the upper component and the lower component may be made of different materials. For example, the upper breather pipe, the lower breather pipe, the upper drain pipe and the lower drain pipe may be made of iron.

In the present embodiment, joining methods such as plasma welding, spot welding, in-furnace brazing, TIG welding and seam welding are used, but other joining methods that have less influence of oxygen on a joining target may be adopted.

As described above, a fuel tank (30) according to the present embodiment includes: an upper component (32) including an upper panel (41) forming a tank upper shell and an inlet plate (47) formed separately from the upper panel; a lower component (33) including a lower panel (61) forming a tank lower shell and a lower connection plate (71) formed separately from the lower panel; and a pipe (the first breather hose 81 and the first drain hose 82) passing through inside of the upper panel and the lower panel and connecting the inlet plate and the lower connection plate. The inlet plate is joined to the upper panel, the lower connection plate is joined to the lower panel, and the lower panel is joined to the upper panel. According to this configuration, the upper panel and the inlet plate are formed separately, and the lower panel and the lower connection plate are formed separately. Therefore, even when work is suitable for a material of each member but has size restrictions, the work can be performed on the inlet plate and the lower connection plate. In this way, it is possible to flexibly select work that satisfies manufacturing restrictions due to the material and size. In addition, the upper component and the lower component are integrated, so that the fuel tank in which the pipe passes through the tank is manufactured. In order to maintain an appearance, a large tank cover that covers the entire tank is not required, and without a double structure, capacity of the fuel tank is not reduced.

In the fuel tank according to the present embodiment, the upper component and the lower component are made of titanium or titanium alloy. According to this configuration, members can be joined to each other in an environment suitable for titanium or titanium alloy, whereby a weight of the fuel tank can be reduced and weather resistance and rust resistance can be improved.

In the fuel tank according to the present embodiment, an opening (67) along an outer peripheral edge (75) of the inner connection plate is formed in the inner panel and the outer peripheral edge of the inner connection plate is located on an outer surface side of the fuel tank relative to the opening along the outer peripheral edge of the lower connection plate, and an opening edge (68) of the inner panel 61 is located closer to the outer surface side of the tank and the outer peripheral edge of the inner connection plate is joined to the opening edge of the inner panel. According to this configuration, the outer peripheral edge of the inner connection plate can be easily and reliably welded to the opening edge of the inner panel from the outside of the tank.

In the fuel tank according to the present embodiment, the upper component includes an upper pipe (the upper breather pipe 51 and the upper drain pipe 52) extending from the inlet plate into the tank and the lower component includes a lower pipe (the lower breather pipe 73 and the lower drain pipe 74) penetrating the lower connection plate, and the pipe is connected to the upper pipe and the lower pipe, the upper pipe is joined to the inlet plate and the lower pipe is joined to the lower connection plate. According to this configuration, the inlet plate and the upper pipe are formed separately, and the lower connection plate and the lower pipe are formed separately. Therefore, a joining method suitable for the material and size of the inlet plate and the upper pipe and a joining method suitable for the material and size of the lower connection plate and the lower pipe can be used.

In the fuel tank according to the present embodiment, an end portion protruding from the lower pipe to the outside of the tank is located inward than the upper peripheral edge of the lower connection plate in a state of directly facing the lower connection plate. According to this configuration, when the lower connection plate is joined to the lower panel, the end portion protruding from the lower pipe to the outside of the tank does not interfere.

A method for manufacturing the fuel tank according to the present embodiment includes: a step of manufacturing an upper component by joining an inlet plate formed separately from an upper panel forming a tank upper shell to the upper panel; a step of manufacturing a lower component by joining a lower connection plate formed separately from a lower panel forming a tank lower shell to the lower panel; and a step of connecting the inlet plate and the lower connection plate by a pipe passing through the tank, and joining and integrating the upper panel and the lower panel. According to this configuration, the upper panel and the inlet plate are formed separately, and the lower panel and the lower connection plate are formed separately. Therefore, even when work is suitable for a material of each member but has size restrictions, the work can be performed on the inlet plate and the lower connection plate. In this way, it is possible to flexibly select work that satisfies manufacturing restrictions due to the material and size. In addition, the upper component and the lower component are integrated, so that the fuel tank in which the pipe passes through the tank is manufactured. In order to maintain an appearance, a large tank cover that covers the entire tank is not required, and without a double structure, capacity of the fuel tank is not reduced.

In the method for manufacturing the fuel tank according to the present embodiment, the step of manufacturing the upper component includes a sub-step of brazing an upper pipe to the inlet plate in a furnace and a sub-step of TIG-welding the inlet plate to the upper panel, the step of manufacturing the lower component includes a sub-step of brazing a lower pipe to the lower connection plate in the furnace and a sub-step of TIG-welding the lower connection plate to the lower panel, and the step of integrating includes a sub-step of connecting the upper pipe and the lower pipe by the pipe and a sub-step of seam-welding the upper panel and the lower panel. According to this configuration, even if each component is formed of the material that is difficult to be welded in atmosphere, the fuel tank can be manufactured satisfactorily.

In the method for manufacturing the fuel tank according to the present embodiment, the upper component and the lower component are made of titanium or titanium alloy, and the method further includes: a step of roughening a surface of the upper panel joined to the lower panel by performing shot treatment on the surface of the upper panel. According to this configuration, a processing mark such as a scratch or a welding mark on the surface of the upper panel can be eliminated. It is not necessary to cover the surface of the upper panel with a coating film or the like, and a metal surface made of titanium or titanium alloy can be exposed to the outside to improve the appearance. In addition, a weight of the fuel tank can be reduced, and weather resistance and rust resistance can be improved.

Although the present embodiment has been described, the above-described embodiment and modifications may be combined entirely or partially as another embodiment.

The technique of the present invention is not limited to the above-described embodiment, and various changes, substitutions and modifications may be made without departing from the spirit of the technical idea of the present invention. Further, the present invention may be implemented using other methods as long as the technical idea can be implemented by the methods through advance of the technique or other derivative technique. Accordingly, the claims cover all embodiments that may be included within the scope of the technical idea.

What is claimed is:

1. A fuel tank comprising:
an upper component including an upper panel forming a tank upper shell and an inlet plate formed separately from the upper panel;
a lower component including a lower panel forming a tank lower shell and a lower connection plate formed separately from the lower panel; and
a pipe passing through inside of the upper panel and the lower panel and connecting the inlet plate and the lower connection plate, wherein
the upper component includes an upper pipe connector extending from the inlet plate into the fuel tank and the lower component includes a lower pipe connector penetrating the lower connection plate;
the upper panel and the inlet plate are made of titanium or titanium alloy;
the upper pipe connector is joined to the inlet plate by brazing;
an opening is formed at the upper panel;
an outer peripheral edge of the inlet plate is joined to an opening edge of the upper panel by welding;
the lower panel and the lower connection plate are made of titanium or titanium alloy;
the lower pipe connector is joined to the lower connection plate by brazing;
an opening is formed at the lower panel and along an outer peripheral edge of the lower connection plate;
an outer peripheral edge of the lower connection plate is joined to an opening edge of the lower panel by welding;
the pipe is located inside the fuel tank, and is configured to connect the upper pipe connector and the lower pipe connector by connecting a downstream end of the upper pipe connector and an upstream end of the lower pipe connector;
and
the lower panel is joined to the upper panel by welding.

2. The fuel tank according to claim 1, wherein the upper component and the lower component are made of titanium or titanium alloy.

3. The fuel tank according to claim 1, wherein
the outer peripheral edge of the lower connection plate is located on an outer surface side of the fuel tank relative to the opening along the outer peripheral edge of the lower connection plate, and
the opening edge of the lower panel is located closer to the outer surface side of the fuel tank and the outer peripheral edge of the lower connection plate is joined to the opening edge of the lower panel.

4. The fuel tank according to claim 1, wherein
a downstream end of the upper pipe connector and an upstream end of the lower pipe connector are connected via the pipe, the upper pipe connector is joined to the inlet plate and the lower pipe connector is joined to the lower connection plate.

5. The fuel tank according to claim 1, wherein
an end portion protruding from the lower pipe connector to the outside of the fuel tank is located inward than the outer peripheral edge of the lower connection plate in a state of directly facing the lower connection plate.

* * * * *